United States Patent
Grindle et al.

(10) Patent No.: US 9,266,495 B2
(45) Date of Patent: Feb. 23, 2016

(54) DUAL CHAMBER AIRBAG SYSTEM

(71) Applicant: FORD GLOBAL TECHNOLOGIES, LLC, Dearborn, MI (US)

(72) Inventors: Barry Grindle, Saffron Walden Essex (GB); Timothy Scott, Benfleet (GB); Felix Haenel, Cologne NRW (DE); Johannes A. Varcus, Sprokhoevel NRW (DE); Markus Koelsch, Cologne NRW (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/656,075

(22) Filed: Mar. 12, 2015

(65) Prior Publication Data

US 2015/0266446 A1 Sep. 24, 2015

(30) Foreign Application Priority Data

Mar. 19, 2014 (GB) .................................. 1404937.3

(51) Int. Cl.
*B60R 21/16* (2006.01)
*B60R 21/239* (2006.01)
(Continued)

(52) U.S. Cl.
CPC ............. *B60R 21/239* (2013.01); *B60R 21/207* (2013.01); *B60R 21/235* (2013.01); *B60R 21/23138* (2013.01); *B60R 2021/2395* (2013.01); *B60R 2021/23107* (2013.01); *B60R 2021/23146* (2013.01); *B60R 2021/23509* (2013.01); *B60R 2021/26094* (2013.01)

(58) Field of Classification Search
USPC ........................ 280/729, 730.2, 743.1, 743.2
See application file for complete search history.

(56) References Cited

U.S. PATENT DOCUMENTS 5,529,337 A * 6/1996 Takeda .................. B60R 21/233
  280/729
5,692,774 A 12/1997 Acker et al.
(Continued)

FOREIGN PATENT DOCUMENTS

GB    2419116 A      4/2006
JP    H06227348 A    8/1994
WO    2010131787 A1  11/2010

OTHER PUBLICATIONS

Intellectual Property Office, Search Report for the corresponding Great Britain Patent Application No. GB1404937.3 mailed Oct. 17, 2014.

*Primary Examiner* — Toan To
(74) *Attorney, Agent, or Firm* — Frank A. MacKenzie; Brooks Kushman P.C.

(57) ABSTRACT

A side airbag system for a vehicle has a primary airbag and a secondary airbag at least partially surrounding the primary airbag. The primary airbag comprises at least one primary vent venting into the secondary airbag and the secondary airbag comprises at least one secondary vent. The primary airbag is inflated by an inflator and the secondary airbag is inflated by gases leaving the primary airbag through the primary vent. The secondary airbag has a panel overlying the primary vent, and inflation of the primary airbag urges the vent and panel in an outboard direction against outboard vehicle structure to restrict flow through the vent. The inflation rates of the primary and secondary airbags are thereby controlled such that the primary airbag protects a vehicle occupant against impacts with a localized load profile and the primary and secondary airbags together protect the occupant against impacts with a distributed load profile.

20 Claims, 3 Drawing Sheets

(51) Int. Cl.
  *B60R 21/207* (2006.01)
  *B60R 21/231* (2011.01)
  *B60R 21/235* (2006.01)
  *B60R 21/26* (2011.01)

(56) References Cited

U.S. PATENT DOCUMENTS

| | | | | |
|---|---|---|---|---|
| 5,906,391 A | * | 5/1999 | Weir | B60R 21/233 280/729 |
| 6,419,267 B1 | * | 7/2002 | Hashimoto | B60R 21/233 280/729 |
| 6,846,008 B2 | * | 1/2005 | Kamiji | B60R 21/231 280/729 |
| 6,976,702 B2 | * | 12/2005 | Yokota | B60R 21/23138 280/729 |
| 7,195,279 B2 | * | 3/2007 | Rose | B60R 21/2346 280/729 |
| 8,181,988 B2 | * | 5/2012 | Adachi | B60R 21/233 280/729 |
| 2001/0003395 A1 | * | 6/2001 | Ariyoshi | B60R 21/233 280/729 |
| 2002/0113416 A1 | * | 8/2002 | Uchida | B60R 21/233 280/729 |
| 2003/0178831 A1 | * | 9/2003 | Roberts | B60R 21/23138 280/743.1 |
| 2004/0119269 A1 | | 6/2004 | Yokota et al. | |
| 2004/0155440 A1 | * | 8/2004 | Hasebe | B60R 21/233 280/729 |
| 2011/0248485 A1 | | 10/2011 | Gwon | |
| 2012/0256400 A1 | | 10/2012 | Shimono | |
| 2015/0097359 A1 | * | 4/2015 | Rickenbach | B60R 21/231 280/729 |

\* cited by examiner

DUAL CHAMBER AIRBAG SYSTEM

CROSS-REFERENCE TO RELATED APPLICATIONS

This application claims foreign priority benefits under 35 U.S.C. §119(a)-(d) to GB 1404937.3 filed Mar. 19, 2014, which is hereby incorporated by reference in its entirety

TECHNICAL FIELD

The present disclosure relates to an airbag system for protecting occupants of a motor vehicle during a side impact event.

BACKGROUND

FIG. 1 shows two different collision impact scenarios that may occur to the side 10 of a vehicle in which an occupant 40 may be sitting on a seat 50. FIG. 1A depicts a pole event in which the side 10 of the vehicle may impact a pole 20. The vehicle may impact the pole at a high speed and the pole may be directly aligned with the occupant. As denoted by the dashed lines, the pole 20' may deform the side 10' of the vehicle during the impact. The deformation of the vehicle side 10' results in a localized intrusion into a vehicle cabin 30.

By contrast, FIG. 1B depicts a vehicle-to-vehicle type event in which the side 10 of the vehicle may impact another vehicle 60. As denoted by the dashed lines, the other vehicle 60 may deform the side 10" of the vehicle during the impact. The deformation of the vehicle side 10" results in an intrusion into the vehicle cabin 30, which is spread over a wider area than the intrusion with the pole event.

As shown in FIG. 2, such intrusions into the vehicle cabin 30 may be mitigated against by a Side Air Bag (SAB) 60. The SAB 60 may be provided in the seat 50 and may be inflated by an inflator 70 when an impact has been detected. However, with a conventional SAB it is difficult to balance the performance requirements for all side impact events. For example, the pole event will require very fast deployment of the SAB between the occupant and the intruding pole and/or vehicle structure. A suitably high and rapid internal bag pressure is desirable to distribute the load across the occupant torso and avoid the intruding structure pressing through the bag and locally point loading the occupant.

By contrast, in the case of a vehicle impacting the side of the vehicle, although the impact speed may be similar the intrusion rate and load profile will be different. As a result, a vehicle-to-vehicle impact may require the working bag pressure later in the collision event.

However, if the SAB is optimized for the pole event the bag may be under pressure for the vehicle impact, as the SAB may have reached its peak pressure and started to deflate. Conversely, if the SAB is optimized for the vehicle impact the bag may be under pressurized for the pole event.

SUMMARY

According to a first aspect of the present disclosure there is provided apparatus comprising a seat for installation in a vehicle with an outboard side of the seat facing a vehicle side; a primary airbag mounted to the outboard side of the seat and having a vent on an outboard-facing wall; and a secondary airbag enclosing the primary airbag and having a panel overlying the vent, inflation of the primary airbag urging the vent and panel against the vehicle side, the panel restricting flow through the vent According to a second aspect of the present disclosure there is provided a side airbag system for a vehicle, comprising a primary airbag having a vent on an outboard-facing wall thereof; and a secondary airbag enclosing the primary airbag and having a panel covering the vent, whereby inflation of the primary airbag urges the vent and panel in an outboard direction and against vehicle structure, the panel restricting flow through the vent.

The impact with the localized load profile and the impact with the distributed load profile may be applied to the side of the vehicle, e.g. as opposed to the front, back or top of the vehicle. The impact with the localized load profile may be applied to the side of the vehicle at a localized point along the length of the vehicle. By contrast, the impact with the distributed load profile may be applied to the side of the vehicle over at least a longitudinal portion of the length of the vehicle. However, the impacts resulting in both the localized load profile and the distributed load profile may be distributed in a substantially vertical direction. For example, while the impact with the localized load profile may be applied at a local longitudinal point, it may also be distributed in a substantially vertical direction.

The secondary airbag may substantially surround, e.g. envelop, the primary airbag. The primary airbag may be coupled to the inflator. The secondary airbag may be coupled to the inflator. Alternatively, the secondary airbag may be coupled to the primary airbag, e.g. about an edge of the secondary airbag.

One or more of the primary vents may be located and/or the primary and secondary airbags may be configured such that the secondary airbag may overlie and substantially cover the one or more of the primary vents for a period of time during inflation, e.g. when the primary airbag is at least partially inflated.

One or more of the primary vents may be located and/or the primary and secondary airbags may be configured such that the primary and secondary airbags in the region of the one or more of the primary vent may press against a structure of the vehicle so as to substantially cover the one or more of the primary vents for a period of time during inflation, e.g. when the primary airbag is at least partially inflated.

The primary airbag may comprise one or more side wall portions. The primary airbag may comprise an end wall portion. The side wall portions may be provided between the inflator and the end wall portion. One or more, e.g. all, of the primary vents may be provided on the side wall portions. The primary vents may be positioned such that during inflation the gases flowing through the primary vents may flow in a direction radially outwardly with respect to the direction of flow from the inflator.

The primary vents and secondary vents may be positioned such that the primary vents may not vent directly into the secondary vents. The secondary vents may be laterally spaced apart from the primary vents. For example, one or more of the secondary vents may be provided opposite the primary bag end wall portion, which may not comprise a primary vent.

One or more of the primary vents and/or secondary vents may comprise a tunnel, e.g. tubular tunnel, through which gases leaving the primary chambers and/or secondary chambers may flow. One or more of the primary vents and/or secondary vents may comprise a flap valve. Such a flap valve may comprise a flap of material extending over the vent. One or more of the primary vents and/or secondary vents may comprise a panel of woven fabric that may permit venting through the weave of the fabric.

The shape of the primary and secondary airbags may be for optimized for improved occupant coupling.

A seat may comprise the side airbag system disclosed herein. A vehicle, such as an automobile, van or any other vehicle, may comprise the side airbag system and/or seat disclosed herein.

According to a another aspect of the present disclosure there is provided a method of deploying a side airbag system for a vehicle, the side airbag system comprising a primary airbag defining a primary chamber and a secondary airbag defining a secondary chamber, the primary airbag comprising one or more primary vents configured to vent into the secondary chamber, the method comprising:

inflating the primary airbag with an inflator such that the primary airbag fully inflates before the secondary airbag and that the primary airbag protects an occupant of the vehicle against impacts with a localized load profile along the length of the vehicle; and inflating the secondary airbag with gases leaving the primary chamber through the one or more primary vents such that the primary and secondary airbags together protect the occupant against impacts with a distributed load profile along the length of the vehicle.

For a better understanding of the present disclosure, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
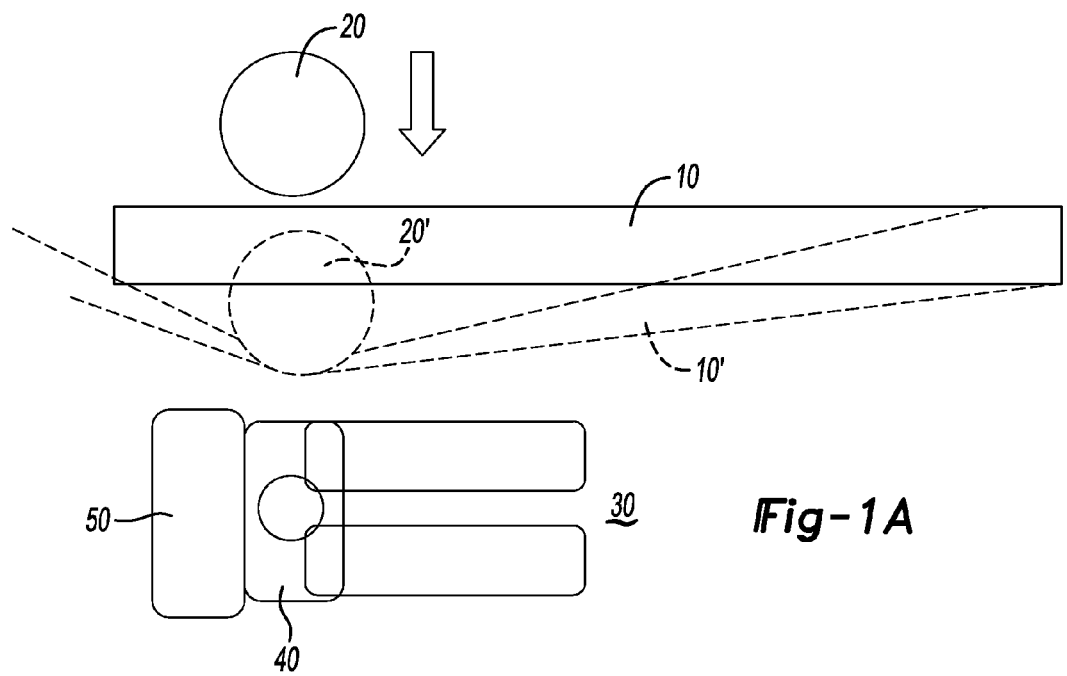
FIGS. 1A and 1B show plan schematic views of the side of a vehicle before and after a pole-type collision event and a vehicle-type collision event respectively.
Figure 1B:
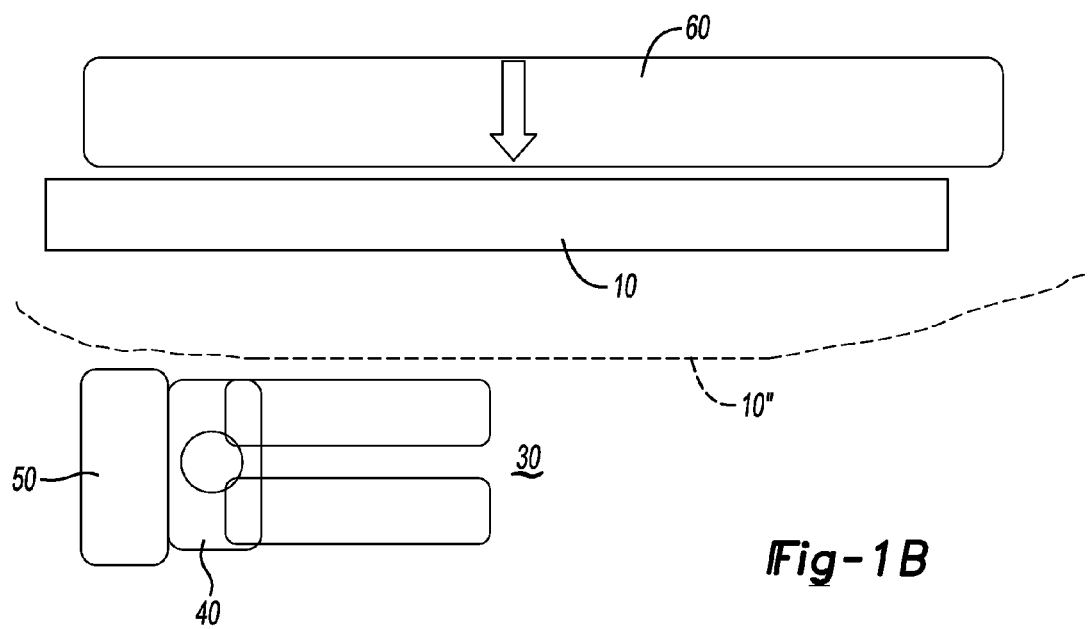
Figure 2:
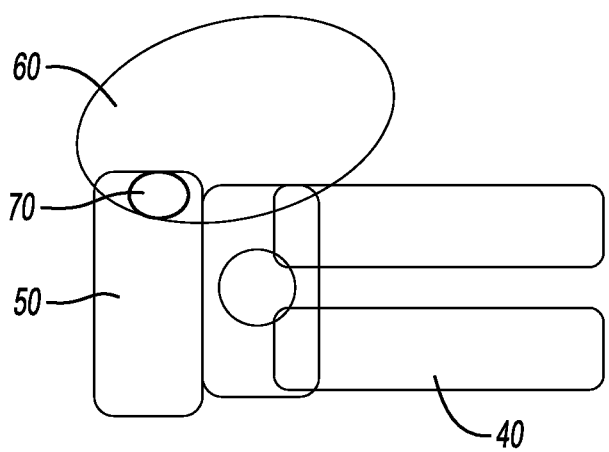
FIG. 2 shows a plan schematic view of a conventional side airbag in a deployed state.
Figure 3A:
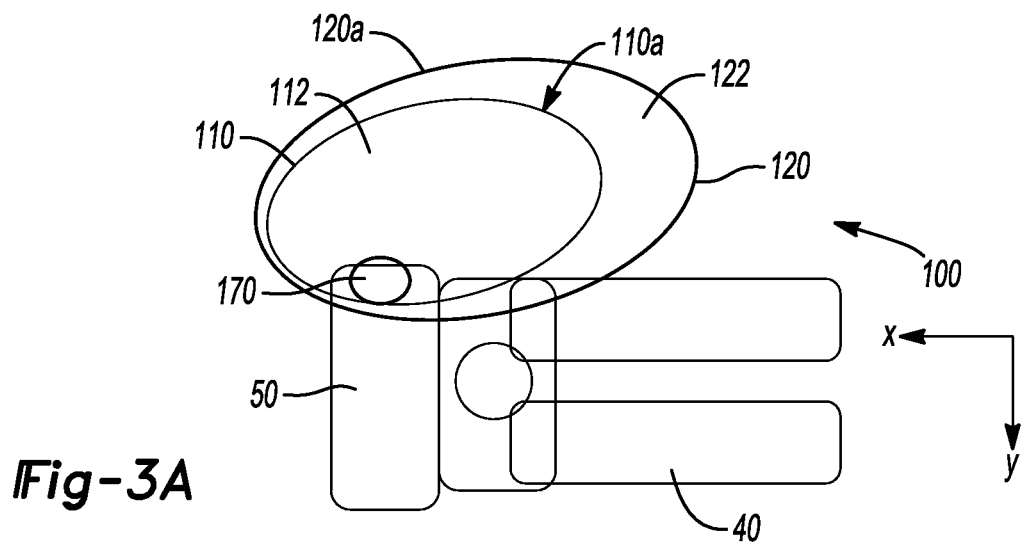
FIGS. 3A and 3B show plan schematic views of side airbag systems according to first and second examples of the present disclosure respectively.
Figure 4A:
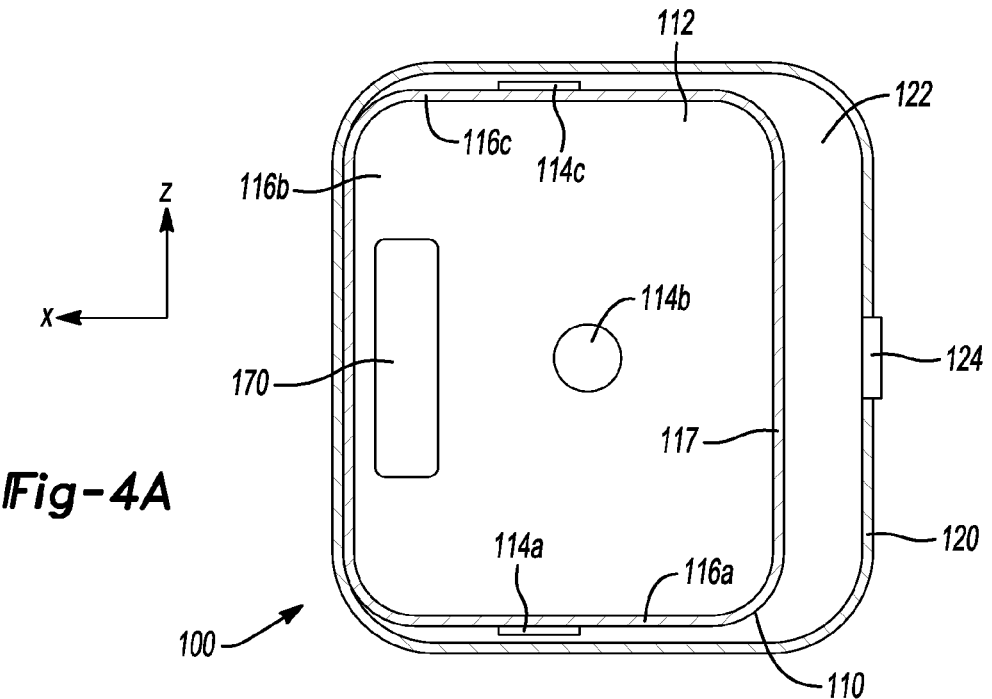
FIGS. 4A and 4B show schematic cross-sectional views of a dual-chamber side airbag according to the first example of the present disclosure with the secondary airbag in a partially inflated state and in a fully inflated state respectively.
Figure 4B:
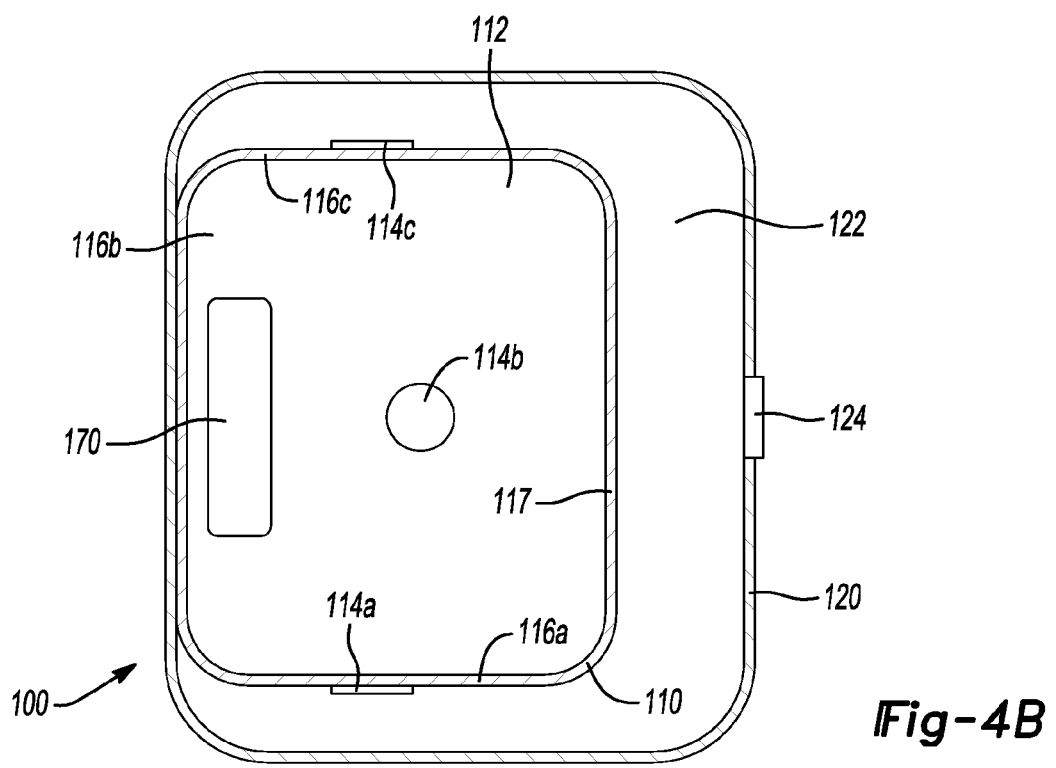

With reference to FIGS. 3A, 4A and 4B, a side airbag system 100 according to a first example of the present disclosure may comprise a primary airbag 110 defining a primary chamber 112 and a secondary airbag 120 defining a secondary chamber 122. The primary airbag 110 is inflated by an inflator 170. By contrast, the secondary airbag 120 is inflated solely by gases leaving the primary chamber 112 through one or more primary vents (which will be described in more detail below with reference to FIGS. 4A and 4B). When the side airbag system is installed in a vehicle as shown, the primary airbag 110 and secondary airbag 120 have respective outboard-facing walls or surfaces 110a and 120a which are oriented toward side vehicle structure 10 (refer to FIGS. 1A, 1B).

Figure 3B:
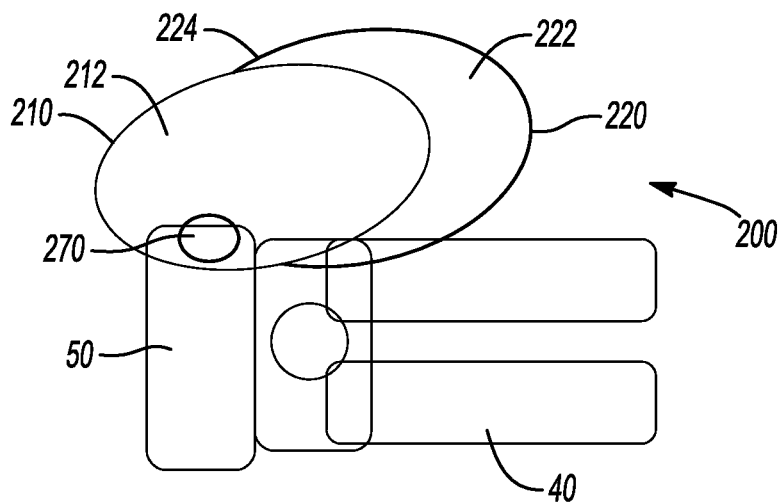

As depicted in FIGS. 3A, 4A and 4B, the secondary airbag 120 may completely surround, e.g. envelop, the primary airbag 110. Accordingly, the primary and secondary airbags 110, 120 may both be coupled to the inflator 170. However, in a second example of the present disclosure depicted in FIG. 3B, a side airbag system 200 comprises a secondary airbag 220, which may be coupled to a primary airbag 210 about an edge 224 of the secondary airbag. As for the first example, the primary airbag 210 is inflated by an inflator 270 and the secondary airbag 220 is inflated solely by gases leaving the primary chamber 212 through one or more primary vents.

The primary and secondary airbags 210, 220 of the second example may be separate bags that have been joined together. However, it is equally envisaged that the primary and secondary airbags may be portions of the same bag, for example with an inner wall separating primary and secondary chambers 212, 222.

Prior to deployment, the airbag systems 100, 200 may be provided in a seat 50 of the vehicle, such as a front passenger seat, driver seat or any other seat. However, it is also envisaged that the airbag systems 100, 200 may be provided in a portion of the vehicle structure, such as a door pillar, door frame or any other portion of the vehicle.

FIGS. 4A and 4B show the airbag system 100 according to the first example in more detail. Although FIGS. 4A and 4B relate to the first example, it will be appreciated that the teachings below may equally apply to the airbag system 200 according to the second example. Furthermore, FIGS. 4A and 4B are schematic and as such it will be appreciated that the primary and secondary airbags are not necessarily shaped in the way shown.

FIG. 4A shows a schematic view of the primary airbag 110 in a fully inflated state and the secondary airbag 120 in a partially inflated state. FIG. 4B shows a schematic view of both the primary and secondary airbags 110, 120 in a fully inflated state. Although FIGS. 4A and 4B do not show the primary and secondary airbags 110, 120 being coupled to the inflator 170, the primary and secondary airbags may nevertheless be coupled to the inflator in a different plane to that shown in FIGS. 4A and 4B.

As mentioned above, the primary airbag 110 comprises one or more, e.g. three, primary vents 114a, 114b, 114c, which are configured to vent into the secondary chamber 122. In addition, the secondary airbag 120 comprises one or more, e.g. one, secondary vents 124, which vent to the atmosphere within the vehicle cabin and therefore permit the secondary bag to deflate after the collision event.

The primary airbag 110 may comprise one or more side wall portions 116a, 116b, 116c. The primary airbag 110 may comprise an end wall portion 117. The side wall portions 116a, 116b, 116c may be provided between the inflator and the end wall portion 117. The side wall portions 116a, 116b, 116c and end wall portion 117 may comprise separate panels of material that have been joined together or may comprise a single panel. Accordingly, the side and end wall portions 116, 117 are not necessarily clearly demarked or distinct. However, the end wall portion 117 may be a part of the primary airbag 110 that is furthest from the inflator 170 when the primary airbag is fully inflated.

One or more of the primary vents 114a, 114b, 114c may be provided on the side wall portions 116a, 116b, 116c. For example, respective primary vents 114a, 114b, 114c may be provided on respective side wall portions 116a, 116b, 116c. By contrast, the end wall portion 117 may not comprise a primary vent and the secondary vents 124 may be provided opposite the primary bag end wall portion 117. In this way, the primary vents 114a, 114b, 114c and secondary vents 124 may be positioned out of alignment with one another such that the primary vents do not vent directly into the secondary vents as gases flow from the primary chamber 112 to the secondary chamber 122. This allows pressure to build up in the secondary chamber 122.

It will be appreciated that the primary and secondary vents may be located in other positions. For example, the secondary vents may be laterally spaced apart from the primary vents such that the primary vents do not vent directly into the secondary vents.

Similarly, the primary vents may be spaced apart from the inflator such that the inflator does not vent directly into the primary vents. For example, the primary vents 114a, 114b, 114c may be positioned such that during inflation the gases flowing through the primary vents may flow in a direction radially outwardly with respect to the direction of flow from the inflator, e.g. with respect to a line from the inflator to the end portion 117.

The primary vents 114a, 114b, 114c and/or secondary vents 124 may simply comprise an opening in the material forming the airbag. Such openings may be reinforced, e.g. with a seam. One or more of the primary vents 114a, 114b, 114c and/or secondary vents 124 may comprise a portion or panel of woven fabric that may permit venting through the weave of the fabric. However, one or more of the primary vents 114a, 114b, 114c and/or secondary vents 124 may comprise a tunnel, e.g. tubular tunnel, through which gases leaving the primary chamber 112 and/or secondary chamber 122 may flow. In the case of the primary vents, such a tunnel may extend into the secondary chamber 122. Additionally or alternatively, one or more of the primary vents 114a, 114b, 114c and/or secondary vents 124 may comprise a flap valve. Such a flap valve may comprise a flap of material extending over the vent.

Furthermore, the primary vents 114a, 114b, 114c and/or secondary vents 124 may comprise a frangible opening, e.g. such that the vent may remain closed until a predetermined pressure difference across the vent has been reached. By way of example, the primary vents 114a, 114b, 114c and/or secondary vents 124 may comprise pressure sensitive vents with a tear stitch, rupturable membrane or any other frangible opening. Such openings may permit the primary chamber 112 to reach its working pressure more quickly.

With reference to FIG. 4A, which shows the secondary airbag 120 in a partially inflated state, the airbag system 100 may be configured such that the secondary airbag 120 may substantially or at least partially cover the one or more of the primary vents 114a, 114b, 114c for a period of time during inflation, e.g. when the primary airbag 110 is at least partially inflated. Covering one or more of the primary vents 114a, 114b, 114c during part of the inflation may allow the primary airbag 110 to be fully inflated faster than would have been achieved otherwise.

The covering of one or more of the primary vents 114a, 114b, 114c during part of the inflation may be achieved by suitable positioning of one or more of the primary vents 114a, 114b, 114c. For example, one or more of the primary vents 114a, 114b, 114c may be positioned close, e.g. adjacent, to where the primary and secondary bags are coupled to one another, such as close to the inflator 170. The distances between the primary and secondary airbags 110, 120 when fully inflated will be smaller at locations closer to where the primary and secondary bags are coupled together. Therefore, providing one or more of the primary vents 114a, 114b, 114c in this region will enable such primary vents to be substantially blocked by the secondary airbag for a period of time during inflation.

Additionally or alternatively, the covering of one or more of the primary vents 114a, 114b, 114c during part of the inflation may be achieved by the configuration, e.g. shape, of the primary and/or secondary airbags 110, 120. For example, the secondary airbag 120 may be shaped so that secondary airbag initially expands in a direction away from the inflator 170, e.g. away from the end wall portion 117 of the primary airbag 110, as seen in FIG. 4A. The secondary airbag 120 may then expand in a direction away from the side wall portions 116a, 116b, 116c, as seen in FIG. 4B. By the secondary airbag 120 initially expanding away from the inflator 170, the primary vents 114a, 114b, 114c may remain substantially covered by the secondary airbag 120 during this initial period. Although not shown, one or more tethers may be provided, e.g. between the primary and secondary airbags 110, 120 to assist in regulating the bag shapes and/or deployment direction. Such tethers may be connected to the primary airbag 110 at one end and the secondary airbag 120 at another end.

Again, additionally or alternatively, one or more of the primary vents 114a, 114b, 114c may be located and/or the primary and secondary airbags may be configured such that the primary and secondary airbags 110, 120 in the region of the one or more of the primary vents are pressed against a structure of the vehicle outboard of the seat and airbag system, such as a door, door frame, pillar or window, so as to substantially cover the one or more of the primary vents for a period of time during inflation, e.g. when the primary airbag is at least partially inflated. In the particular example shown in FIG. 4, the primary and secondary airbags 110, 120 in the region of the primary vent 114b may press against the outboard vehicle structure and thereby block primary vent 114b. This may happen until the secondary chamber 122 has reached a certain pressure which permits the primary and secondary airbags 110, 120 to separate in the region of primary vent 114b. This would allow the primary airbag 110 to be fully inflated faster than would have been achieved otherwise and would reduce the rate at which the secondary airbag 120 is initially inflated.

Accordingly, primary vent 114b may be provided on side wall portion 116b which may face outboard with respect to the vehicle (in the negative y-axis direction). The primary vents 114a, 114c may otherwise be provided on side wall portions 116a, 116c, which may face upward and downward relative to the vehicle respectively. A further primary vent (not shown) may or may not be provided on a side wall portion of the primary airbag 110 which may face inwardly with respect to the vehicle. Typically, such inward facing vents are not provided on previously-proposed side air bags to avoid venting gases towards the occupant. However, with the outer secondary airbag 120 of the present disclosure such an inwardly facing primary vent may be provided as the secondary airbag 120 may shield the occupant from the venting gases.

In terms of the size of the primary and secondary airbags 110, 120, the secondary chamber 122 may occupy a volume less than the primary chamber 112 volume when in a fully inflated state. For example, the primary chamber 112 may occupy a volume of between substantially 6 liters and substantially 12 liters when in a fully inflated state. In a particular example, the primary chamber 112 may occupy a volume of substantially 10 liters when in a fully inflated state. The primary and secondary chambers 112, 122 may together occupy a volume of between substantially 10 liters and substantially 20 liters when in a fully inflated state. In other words, the volume of the secondary chamber 122 may be between substantially 4 liters and substantially 8 liters when in a fully inflated state. In a particular example, the primary and secondary chambers 112, 122 may together occupy a volume of substantially 15 liters when in a fully inflated state. In other words, the volume of the secondary chamber 122 may be substantially 5 liters.

The total effective flow cross-sectional area of the secondary vents 124 may be substantially equal to or larger than the total effective flow cross-sectional area of the primary vents 114a, 114b, 114c. For example, the total effective flow cross-sectional area of the primary vents 114a, 114b, 114c may be approximately equivalent to a circular opening with a diameter in a range from 15 mm to 25 mm. In other words, the primary vents 114a, 114b, 114c may be sized such that the total flow rate through all of the primary vents may be substantially the same as the flow rate through a single circular opening with a diameter of between 15 mm and 25 mm. In a particular example, the total effective flow cross-sectional area of the primary vents 114a, 114b, 114c may be approximately equivalent to a circular opening with a diameter of 20 mm. By contrast, the total effective flow cross-sectional area of the secondary vents 124 may be approximately equivalent to a circular opening with a diameter of 20 mm to 30 mm. In a particular example, the total effective flow cross-sectional area of the secondary vents 124 may be approximately equivalent to a circular opening with a diameter of 25 mm. However, in an alternative arrangement, the total effective flow cross-sectional area of the secondary vents 124 may be substantially equal to or less than the total effective flow cross-sectional area of the primary vents 114a, 114b, 114c.

The primary and secondary airbags 110, 120 may be configured such that the primary airbag 110 fully inflates first and protects an occupant of the vehicle against side impacts with a localized load profile along the length of the vehicle. The primary and secondary airbags 110, 120 may be further configured so that the secondary airbag 120 fully inflates after the primary airbag 110 and the primary and secondary airbags together protect the occupant against side impacts with a distributed load profile along the length of the vehicle. In this way, the airbag systems 100, 200 can be better tailored for both a localized collision event and a distributed collision event. For example, the primary airbag 110, 210 may rapidly deploy, thereby protecting the occupant against the high localized forces and rapid intrusion experienced during a pole type collision event. By contrast, the secondary airbag 120, 220 may be fully inflated after the primary airbag, but may cover a larger area, thereby protecting the occupant against the more widespread forces experienced during a vehicle-to-vehicle type collision event.

The localized load profile may correspond to an impact load applied at a substantially discrete location along the length of the vehicle. For example, the localized load profile may be caused by a collision of the vehicle with an item or edge that is substantially elongate extending in a direction with a vertical component. As such, the localized load profile may be caused by an impact with a pole, tree, post, bollard, edge or any other elongate member or portion. For example, the localized load profile may be caused by an impact with a pole 254 mm (10 inches)+/−6 mm (0.25 inches) in diameter.

The distributed load profile may correspond to an impact load applied along at least a non-discrete portion of the length of the vehicle. The distributed load profile may be caused by a collision with an item that is not substantially elongate extending in a direction with a vertical component. For example, the distributed load profile may be caused by a vehicle to vehicle collision type event. In particular, the distributed load profile may result from the conditions defined in US Federal Motor Vehicle Safety Standards §571.214 section 8 (Test conditions for determining compliance with moving deformable barrier requirements), which is herein incorporated by reference.

Furthermore, the shape of the primary and secondary airbags may be optimized for improved occupant coupling. For example, the secondary airbag 120, 220 may be shaped to extend towards the pelvis, while the primary airbag 110, 210 may remain in the region of the occupant's torso and/or head. In this way, the airbag systems 100, 200 of the present disclosure may be able to withstand higher loads on the pelvis. The separate primary and secondary airbag chambers permit the overall airbag systems to be tailored for a wider range of applications.

It will be appreciated by those skilled in the art that although the invention has been described by way of example with reference to one or more examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
 a seat for installation in a vehicle with an outboard side of the seat facing a vehicle side;
 a primary airbag mounted to the outboard side of the seat and having a vent on an outboard-facing wall; and
 a secondary airbag enclosing the primary airbag and having a panel overlying the vent, inflation of the primary airbag urging the vent and panel against the vehicle side, the panel restricting flow through the vent.

2. The apparatus of claim 1, wherein the primary airbag further comprises at least one second wall facing one of an upward and a downward direction, the second wall having at least one second vent thereon.

3. The apparatus of claim 2, wherein the second vent is located and the primary and secondary airbags are configured such that the secondary airbag substantially covers the second vent for a period of time during inflation prior to the primary airbag reaching full inflation.

4. The apparatus of claim 2, wherein at least one of the vent and the second vent comprises a tunnel through which gases leaving the primary airbag flow.

5. The apparatus of claim 2, wherein at least one of the vent and the second vent comprises a flap valve.

6. The apparatus of claim 2, wherein at least one of the vent and the second vent comprises a panel of woven fabric that permits venting through the fabric.

7. The apparatus of claim 1, wherein the secondary airbag substantially surrounds the primary airbag.

8. The apparatus of claim 1, wherein the secondary airbag is coupled to the primary airbag about an edge of the secondary airbag.

9. The apparatus of claim 1, wherein the secondary airbag has a secondary vent on a wall thereof, the secondary vent positioned such that no vent of the primary airbag vents directly into the secondary vent.

10. The apparatus of claim 1, wherein the secondary airbag occupies a volume less than a volume of the primary airbag when in a fully inflated state.

11. A side airbag system for a vehicle, comprising:
a primary airbag having a vent on an outboard-facing wall thereof; and
a secondary airbag enclosing the primary airbag and having a panel covering the vent, whereby inflation of the primary airbag urges the vent and panel in an outboard direction and against vehicle structure, the panel restricting flow through the vent.

12. The side airbag system of claim 11, wherein the primary airbag further comprises at least one second wall facing one of an upward and a downward direction, the second wall having at least one second vent thereon.

13. The side airbag system of claim 12, wherein the second vent is located and the primary and secondary airbags are configured such that the secondary airbag substantially covers the second vent for a period of time during inflation prior to the primary airbag reaching full inflation.

14. The side airbag system of claim 12, wherein at least one of the vent and the second vent comprises a tunnel through which gases leaving the primary airbag flow.

15. The side airbag system of claim 12, wherein at least one of the vent and the second vent comprises a flap valve.

16. The side airbag system of claim 12, wherein at least one of the vent and the second vent comprises a panel of woven fabric that permits venting through the fabric.

17. The side airbag system of claim 11, wherein the secondary airbag substantially surrounds the primary airbag.

18. The side airbag system of claim 11, wherein the secondary airbag is coupled to the primary airbag about an edge of the secondary airbag.

19. The side airbag system of claim 11, wherein the secondary airbag has a secondary vent on a wall thereof, the secondary vent positioned such that no vent of the primary airbag vents directly into the secondary vent.

20. The side airbag system of claim 11, wherein the secondary airbag occupies a volume less than a volume of the primary airbag when in a fully inflated state.

* * * * *